United States Patent [19]
Kim

[11] Patent Number: 5,960,357
[45] Date of Patent: Sep. 28, 1999

[54] METHOD FOR EXECUTING AUTOMATIC CALLING FUNCTION IN A CORDLESS TELEPHONE SYSTEM

[75] Inventor: Jong-Kwang Kim, Gumi, Rep. of Korea

[73] Assignee: SamSung Electronics Co., Ltd., Suwon, Rep. of Korea

[21] Appl. No.: 08/702,229

[22] Filed: Aug. 23, 1996

[30] Foreign Application Priority Data

Aug. 23, 1995 [KR] Rep. of Korea ...................... 95-26179

[51] Int. Cl.⁶ ............................. H04Q 7/30; H04M 1/00
[52] U.S. Cl. ............................ 455/462; 455/90; 379/434
[58] Field of Search .................................... 455/462, 550, 455/575, 90, 564, 556, 412, 413, 414, 418, 434, 435, 460, 426, 461, 458, 567, 445, 417, 416; 379/428, 433, 434, 40, 51

[56] References Cited

U.S. PATENT DOCUMENTS

| | | |
|---|---|---|
| 4,985,918 | 1/1991 | Tanaka et al. . |
| 4,996,703 | 2/1991 | Gray . |
| 5,165,095 | 11/1992 | Borcherding . |
| 5,175,759 | 12/1992 | Metroka et al. ........................ 455/569 |
| 5,237,602 | 8/1993 | Lazik . |
| 5,239,571 | 8/1993 | Takahashi ............................... 455/564 |
| 5,317,624 | 5/1994 | Obana et al. ........................... 455/412 |
| 5,337,342 | 8/1994 | Kruger et al. . |
| 5,365,573 | 11/1994 | Sakamoto et al. ..................... 455/462 |
| 5,384,844 | 1/1995 | Rydbeck ................................ 379/434 |
| 5,454,035 | 9/1995 | Oba et al. . |
| 5,493,604 | 2/1996 | Hirayama . |
| 5,515,420 | 5/1996 | Urasaka et al. . |
| 5,519,763 | 5/1996 | Namekawa et al. .................... 455/556 |
| 5,528,681 | 6/1996 | Iwai et al. . |
| 5,572,575 | 11/1996 | Yamamoto et al. .................... 455/462 |
| 5,638,441 | 6/1997 | Hattori et al. .......................... 379/433 |
| 5,703,571 | 12/1997 | Cannon et al. ......................... 455/575 |
| 5,815,798 | 11/1995 | Bhagalia et al. ....................... 455/13.4 |

*Primary Examiner*—Dwayne D. Bost
*Assistant Examiner*—Jean A. Gelin
*Attorney, Agent, or Firm*—Robert E. Bushnell, Esq.

[57] ABSTRACT

A method for registering a telephone number for executing an automatic calling function in a cordless telephone system comprising a base station and a "flip-type" remote handset. The base station includes a hook switch for forming a calling loop, a VOX circuit for detecting a non-voice state, a tone detector for detecting a busy tone for informing the state of unavailability of the subscriber's telephone, a memory for registering a telephone number of a destination subscriber thereto and a speaker phone for establishing a telephone call through an external microphone and a speaker. The "flip-type" remote handset includes a flip switch for detecting an opening state and a closing state of a flip and a call key for a calling request. The automatic calling function is executed by: receiving a key input signal corresponding to a telephone number of destination subscriber for registration into a memory; establishing an automatic calling mode for automatically calling the destination subscriber and dialing the registered telephone number upon a calling request; and cutting off the calling when a calling end is detected and converting the automatic calling mode into a call standby state.

23 Claims, 8 Drawing Sheets

METHOD FOR EXECUTING AUTOMATIC CALLING FUNCTION IN A CORDLESS TELEPHONE SYSTEM

CROSS-REFERENCE TO RELATED APPLICATION

This application makes reference to, incorporates the same herein, and claims all benefits accruing under 35 U.S.C. §119 from an application for Method For Executing Automatic Calling Function In A Cordless Telephone System earlier filed in the Korean Industrial Property Office on Aug. 23, 1995, and there duly assigned Ser. No. 26179/1995.

BACKGROUND OF THE INVENTION

1. Technical Field

The present invention relates to a method for executing an automatic calling function in a cordless telephone system comprising a fixed base station and a "flip-type" remote handset having a flip cover, and more particularly, to a method for automatically forming a calling loop of an established telephone number when a hook switch of the base station is off-hooked, or when a dial key corresponding to a telephone number is input by a user, or when a flip cover of a remote handset is opened thereby activating a flip switch, or when a call key is input by a user.

2. Background Art

In general, conventional cordless telephone systems include a fixed base station connected to the telephone line and a remote portable handset connected to the base station by wireless. In such a telephone system, telephone calls can be made with the remote portable handset at a place away from the base station by connecting the remote portable handset to the telephone line through the base station.

One conventional housing for such a remote portable handset is a "flip-type" housing such as disclosed in U.S. Pat. No. 5,384,844 for Pivotable Housing For Hand-Held Transceiver issued to Rydbeck and U.S. Pat. No. 5,327,584 for Portable Radio Having Cover Releasing mechanism And Receive Switch Which Are Operable Together issued to Adachi et al., in which a flip cover, or lid, colloquially known as a "flip" is used to provide protection to a keypad from unintentional activation or exposure to the elements while concomitantly providing a convenient extension to the phone. When the flip is closed, a flip switch electrically connected thereto is closed and the cordless telephone system is usually in a standby mode corresponding to an "on-hook" condition. A call key remains, however, accessible to the user so that, when there is an incoming phone call and the flip is closed, the user can answer the phone call by pressing the call key without having to first open the flip. For the "flip-type" handset to perform other operating functions such as dial or redial function and intercom function, the flip has to be opened to establish an "off-hook" condition and the call key has to be activated before a dial key and function key can be activated to perform a corresponding function.

In such conventional cordless telephone system, necessity often arises for individual users who are very young such as an infant or who are very old such as an illiterate and old person and who have difficulties in memorizing telephone numbers or dialing such telephone numbers to call the same subscriber frequently or to make an emergency call to a necessary destination, and repeated dialing operations are troublesome for everyone in the daily use of the cordless telephone system. Consequently, an effective automatic calling scheme for such a cordless telephone system is necessarily required.

Generally, there are a modest number of automatic calling schemes available in the market today. For example, in U.S. Pat. No. 5,493,604 for Portable Telephone Set With Automatic Dialing Feature, Hirayama '604 provides a memory for storing dial number information of a frequently called subscriber so that, when an automatic dial function is selected, the dial number information of the frequently called subscriber is automatically sent out to the telephone network. While this automatic calling scheme has its own merit, it has been my observation that further improvements can be contemplated.

SUMMARY OF THE INVENTION

Accordingly, it is therefore an object of the present invention to provide an improved cordless telephone system comprising a base station and a "flip-type" remote handset having an automatic calling function which is capable of automatically dialing a telephone number.

It is another object to provide a method for registering a telephone number of a predetermined subscriber and changing a registered telephone number of the predetermined subscriber in a cordless telephone system for an automatic dialing function.

It is also an object to provide a method for automatically dialing a telephone number of a predetermined subscriber when a hook switch of a base station is turned off or when a key is input through a "flip-type" remote handset.

It is further an object to provide a method for automatically dialing a telephone number of a predetermined subscriber when a call key is input through a "flip-type" remote handset.

It is another object to provide a method for automatically dialing a telephone number of a predetermined subscriber upon activation of a flip switch of a "flip-type" remote handset when a flip of the "flip-type" remote handset is opened.

It is yet another object to provide a method for cutting off a calling path of a cordless telephone system when a busy tone is detected during a busy line of either a base station or a "flip-type" remote handset, or when a non-voice state is maintained during a predetermined time period.

It is also another object to provide a method for cutting off a calling path of a cordless telephone system when a hook switch of a base station is turned on during its busy line, or when a flip switch of a "flip-type" remote handset is turned off during its busy line.

These and other objects can be achieved by a method for executing an automatic calling function in a cordless telephone comprising a base station including a hook switch for forming a calling loop, a VOX circuit for detecting a non-voice state, a tone detector for detecting a busy tone, a memory for registering a telephone number of a predetermined subscriber and a speaker phone for establishing a telephone call through an external microphone and a speaker, and a "flip-type" remote handset including a flip switch for detecting an opening state and a closing state of a flip and a call key for a calling request. An automatic calling function is performed by receiving a key input signal corresponding to a telephone number of a predetermined subscriber for registration in a memory; establishing an automatic calling mode for automatically calling the predetermined subscriber and dialing the registered telephone number from the memory upon reception of a calling request to thereby establish a calling path; and cutting off the calling path when a calling end signal is detected and converting the automatic calling mode into a call standby state.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
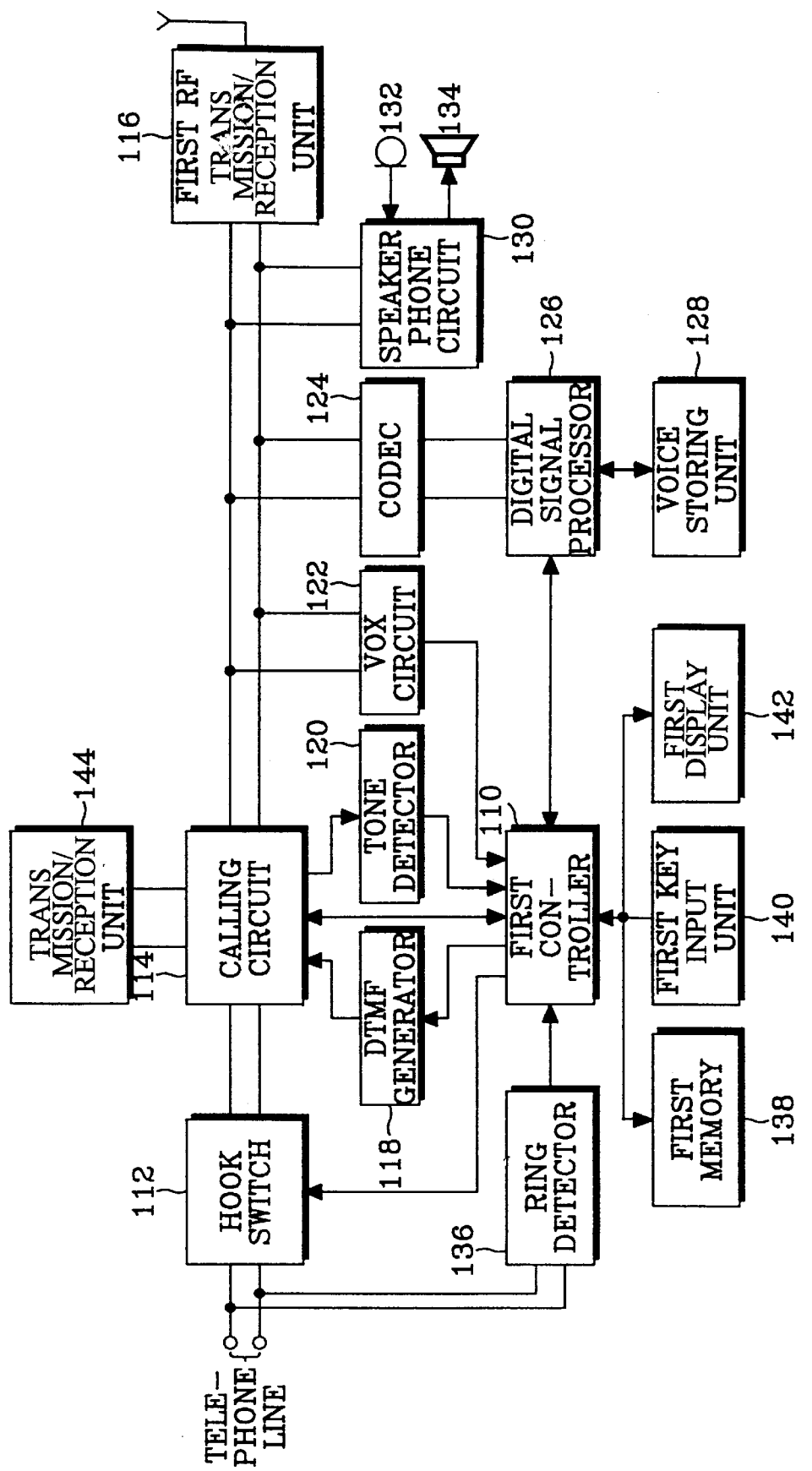
FIG. 1 illustrates a base station of a cordless telephone system constructed according to the principles of the present invention.
Figure 2:
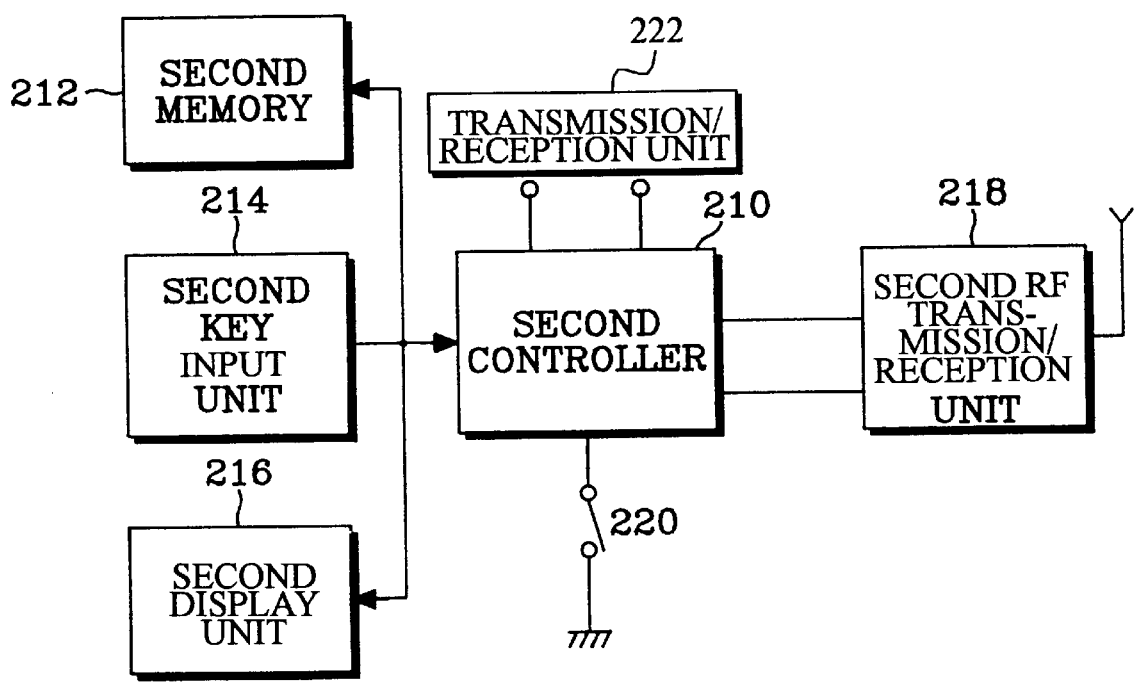
FIG. 2 illustrates a "flip-type" remote handset of a cordless telephone system constructed according to the principles of the present invention.

Referring now to the drawings and particularly to FIGS. 1 and 2, which respectively illustrate a base station and a "flip-type" remote handset of a cordless telephone system constructed according to the principles of the present invention. As shown in FIG. 1, the base station includes a first controller 110 for controlling operation of the cordless telephone system, a hook switch 112 connected to a telephone line, a calling circuit 114, a first RF transmission/reception unit 116, a dual-tone multi-frequency (DTMF) generator 118, a tone detector 120, a voice exchange (VOX) circuit 122, a coder-decoder circuit (CODEC) 124, a digital signal processor 126, a voice storing unit 128, a speaker phone circuit 130, a microphone 132, a speaker 134, a ring detector 136, a first memory 138, a first key input unit 140, a first display unit 142 and a transmissions/reception unit 144. The "flip-type" remote handset as shown in FIG. 2 includes a second controller 210 for controlling operation of the cordless telephone system, a second memory 212, a second key input unit 214, a second display unit 216, a transmission/reception unit 222 a second RF transmission/ reception unit 218, and a flip switch 220. The operation of the cordless telephone system will now be described with reference to FIGS. 1 and 2 as follows.

First controller 110 generally controls the base station of the cordless telephone system. When a call key signal generated in response to depression of a call key located on the "flip-type" remote handset is received or when a flip switch 220 of the remote handset is turned on, the first controller 110 forms the calling loop of the remote handset. In addition, when the hook switch 112 is turned off, the first controller 110 forms the calling loop of a transmission/ reception unit 144 of the base station. And, when dial keys are input by the user from a first key input unit 140, the first controller 110 forms the calling loop of a speaker phone circuit 130 of the base station.

Hook switch 112 is connected to a telephone line connected to a telephone network and is used to connect and cut-off the telephone line from a calling circuit 114 under control of the first controller 110 in order to form or terminate the calling loop. The calling circuit 114 is controlled by the first controller 110 to distribute and transmit a voice signal and all types of tone signals received from the telephone line to a corresponding DTMF generator 118 and tone detector 120. A first RF transmission/reception unit 116 is connected to the calling circuit 114 to transmit the voice signal and the tone signals to the "flip-type" remote handset of the cordless telephone system. A DTMF s generator 118 is connected between the calling circuit 114 and the first controller 110 to convert digital data output from the first controller 110 into a DTMF signal and input the converted DTMF signal to the calling circuit 114. A tone detector 120 is connected between the calling circuit 114 and the first controller 110 to detect the tone signals output from the calling circuit 114, convert the detected tone signal into digital data and input the converted digital data to the first controller 110.

VOX circuit 122 is connected between the calling circuit 114 and the first controller 110 to detect whether there is a voice signal in the busy line and provide a detected result to the first controller 110. The CODEC 124 is connected in parallel with the VOX circuit 122 between the calling circuit 114 and the first RF transmission/reception unit 116 to convert an analog signal into digital data and input converted digital data to a digital signal processor 126, and alternatively, to convert digital data output from the digital signal processor 126 into the analog signal and input the converted analog signal to the calling circuit 114. The digital signal processor 126 is controlled by the first controller 110 to synthesize or analyze digital data input thereto and output from the CODEC 124 into an encoded signal. A voice storing unit 128 is connected to the digital signal processor 126 to store therein or read therefrom the encoded signal output from the digital signal processor 126.

Speaker phone circuit 130 comprising a microphone 132 and a speaker 134 is connected to the calling circuit 114 to form a speaker phone calling loop. The microphone 132 converts the voice signal of the user into an electrical signal in a speaker phone mode and transmits the converted electrical signal to the speaker phone circuit 130. The speaker 134 converts the electrical signal received from the speaker phone circuit 130 into the voice signal for audible reproduction. A ring detector 136 is connected between the telephone line and the first controller 110 to detect a ring signal received from the telephone line and input the detected ring signal to the first controller 110. A first memory 138 includes a function table for containing therein all kinds of functions of the cordless telephone system. An electrically erasable programmable read-only-memory (EEPROM) may be utilized as the first memory 138 so that the first memory 138 can retain stored data even when a power supply is cut-off. A first key input unit 140 typically includes a keypad having a plurality of dial keys (e.g., 0 through 9 inclusive, a "#" key and a "*" key) and function keys for allowing the user to operate the base station of the cordless telephone system. The first display unit 142 is connected to the first controller 110 to provide a visual display of data provided from the first controller 110. The transmission/reception unit 144 is connected to the calling circuit 114 to reproduce or transmit the voice signal through the base station in response to a general telephone call.

Second controller 210 controls the general operation of the "flip-type" remote handset. When a call key signal generated in response to depression of a call key located on the "flip-type" remote handset is received or when a flip switch 220 of the remote handset is turned on, the second controller 210 generates corresponding data to the first controller 110 of the base station. The second memory 212 includes a function table for containing therein all kinds of functions of the remote handset. Again, the EEPROM may be utilized as the second memory 212 so that the second memory 212 can retain stored data even when a power supply is cut-off A second key input unit 214 typically includes a call key and a keypad having a plurality of numeric dial keys (e.g., 0 through 9 inclusive, a "#" key and a "*" key) and function keys for allowing the user to operate the remote handset of the cordless telephone system. A second display unit 216 is connected to the second controller 210 to provide a visual display of data output from the second controller 210. A second RF transmission/reception unit 218 is connected to the second controller 210 to transmit thereto or receive from the base station the voice signal and the tone signals under control of the second controller 210.

Figure 3:
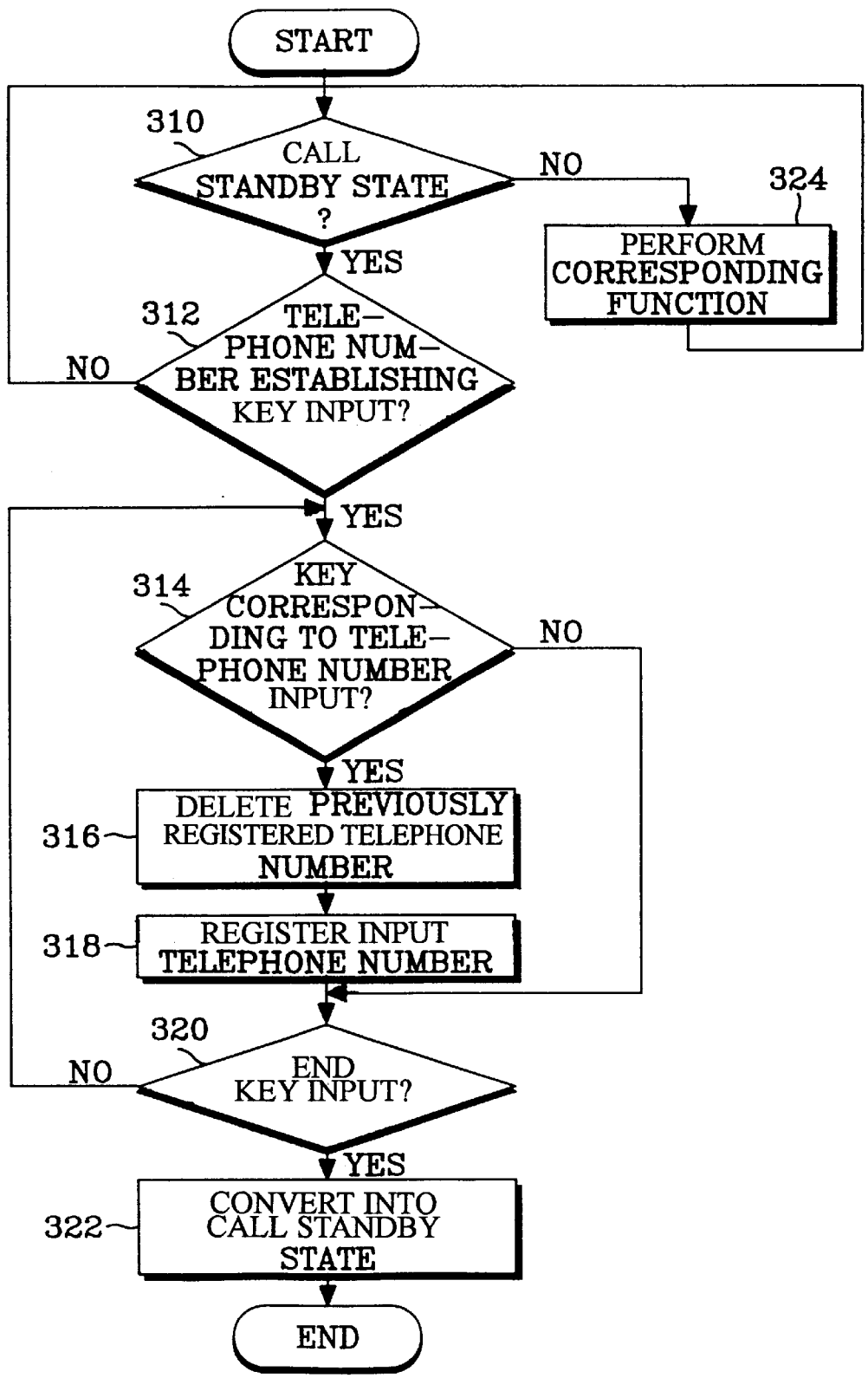
FIG. 3 is a flow chart illustrating a process of registering a telephone number for an automatic dialing through a base station according to the present invention.

Turning now to FIG. 3 which illustrates a process of registering a telephone number of a predetermined subscriber through a base station of a cordless telephone system for executing an automatic calling function according to the present invention. Generally, the process involves the steps of determining whether a telephone number establishing key is input when a base station is in a call standby state; determining whether a numeral key corresponding to a telephone number of a predetermined subscriber is input after a call standby mode is converted into a telephone number establishing mode in response to input of the telephone number establishing key; deleting a previously registered telephone number if a telephone number of a predetermined subscriber is input, and then registering the telephone number as a new number; and converting the telephone number establishing mode back into the call standby state when a call ending key is input.

Figure 4A:
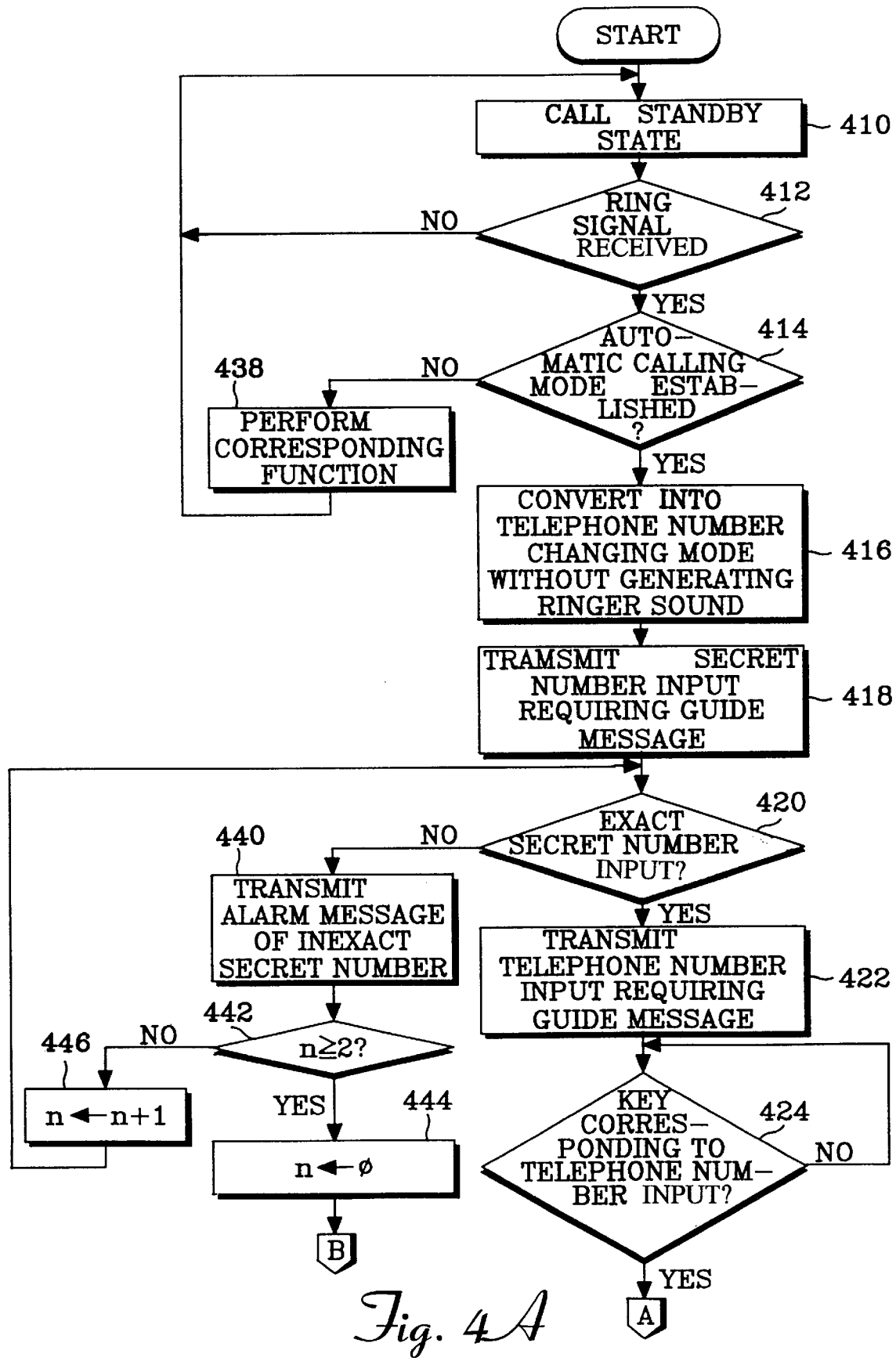
FIGS. 4A and 4B are flow charts illustrating a process of changing a telephone number in the outside for executing an automatic calling according to the present invention.
Figure 4B:
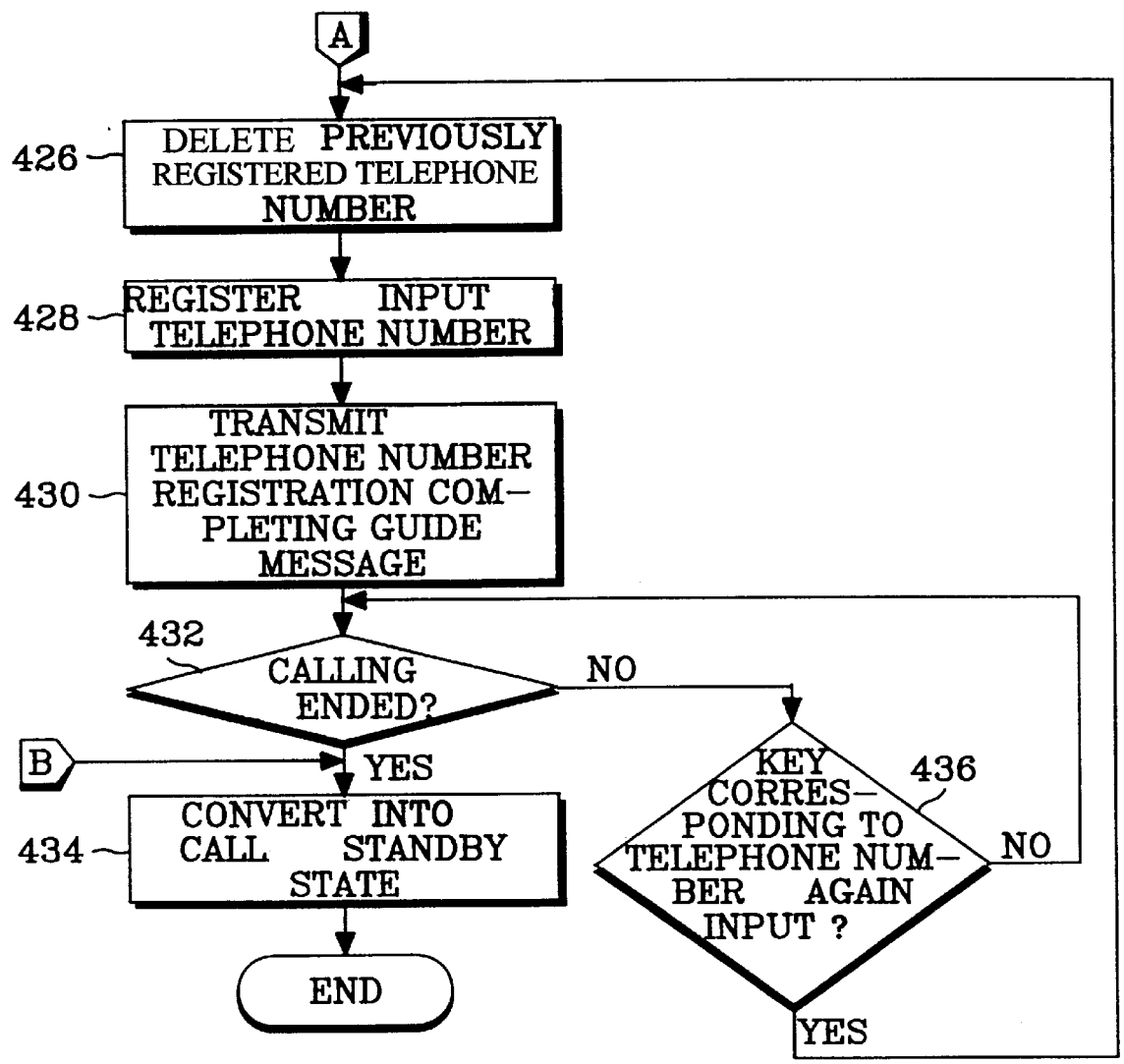

FIGS. 4A and 4B illustrate a process of changing a telephone number of a predetermined subscriber registered in a base station of a cordless telephone system for executing an automatic calling function from an outside and remote telephone system connected to the telephone network according to the present invention. Generally, the process of changing a telephone number registered in the base station involves the steps of determining whether an automatic calling mode is established when a ring signal is received from a telephone line while the base station is in a call standby state; converting the automatic calling mode into a telephone number changing mode without generating a ringer sound, and transmitting a secret number input requiring guide message to a remote and different telephone system; determining whether an exact secret number is input from the remote telephone system in correspondence to the secret number input requiring guide message; transmitting a telephone number input requiring guide message for executing an automatic calling function when the exact secret number is input from the remote and different telephone system; determining whether a telephone number is input from the remote and different telephone system in correspondence with the telephone number input requiring guide message; deleting the previously registered telephone number if the outside telephone number is input, and then registering the input outside telephone number; transmitting the outside telephone number registration completing guide message if the registration of the outside telephone number is ended, and determining whether the calling from the remote and different telephone system is ended to convert the telephone number changing mode back into the call standby state; re-registering a numeral key corresponding to the outside telephone number when the numeral key is again input; transmitting an alarm message of inexact secret number if the inexact secret number is input in correspondence with the secret number input requiring guide message, and then counting a counter; and setting the counter as zero (0) when the counter has a counting value greater than a predetermined value, and then converting the telephone number changing mode back into the call standby state.

Figure 5A:
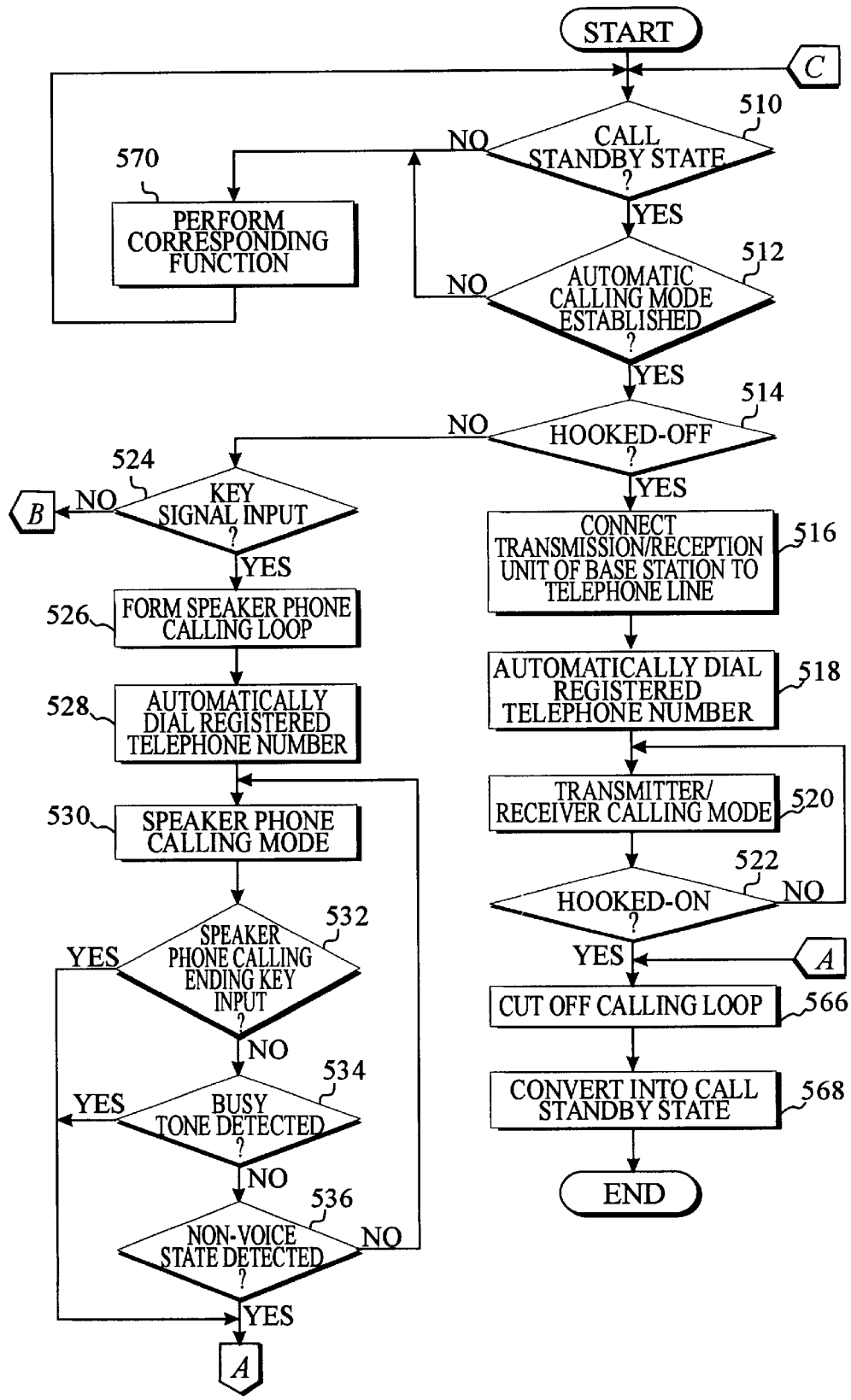
FIGS. 5A and 5B are flow charts illustrating a process of forming a calling loop of an established telephone number according to the present invention.
Figure 5B:
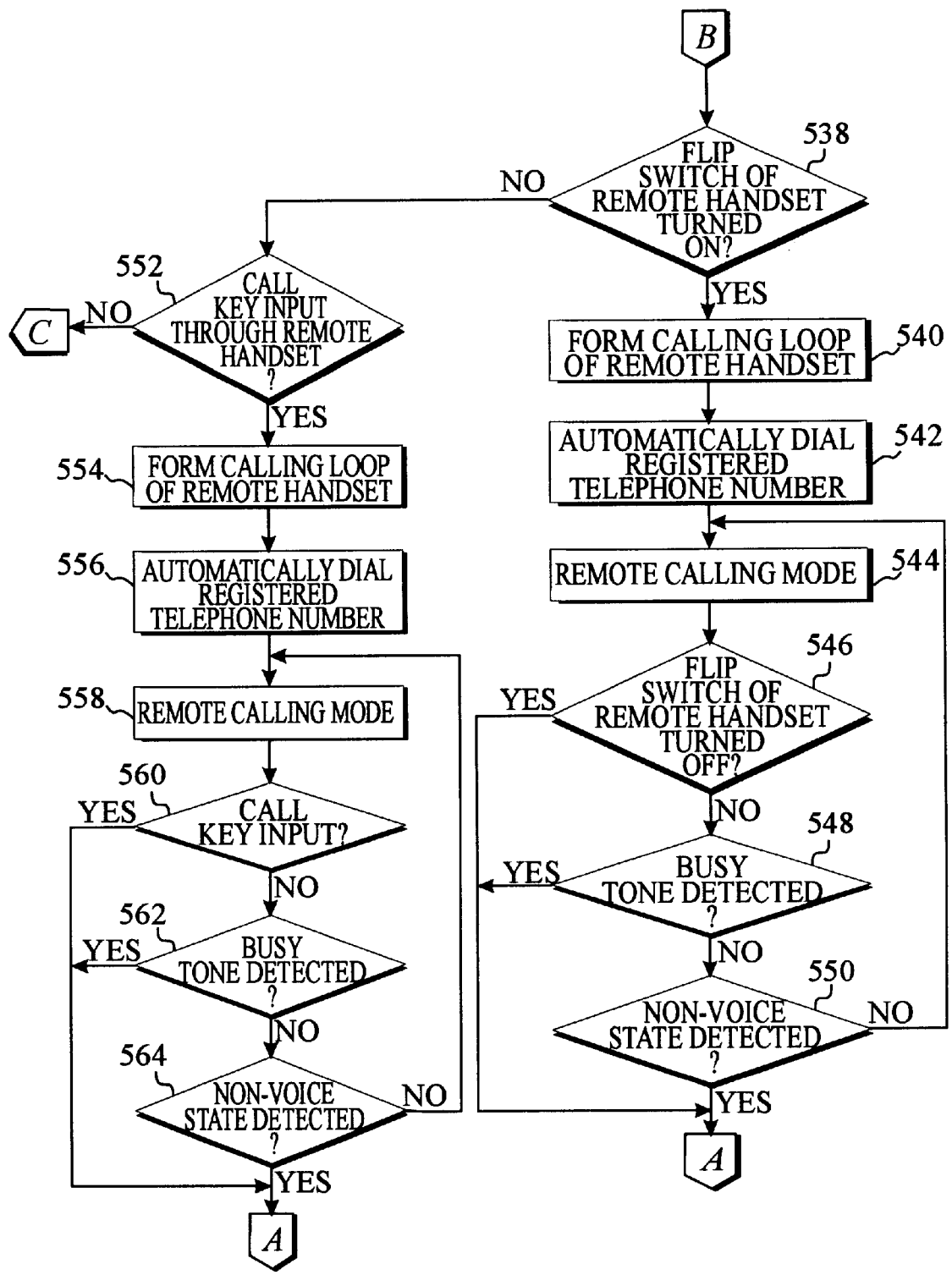

FIGS. 5A and 5B illustrate a process of forming a calling loop of an established outside telephone number according to the present invention. Generally, the process of forming such a calling loop involves the steps of determining whether an automatic calling mode is established when a base station is in a call standby state; determining whether a hook switch is off-hooked, and when the hook switch is hooked-off forming a calling loop of the base station and automatically dialing a registered outside telephone number of a predetermined subscriber to function in a transmitter/receiver calling mode; cutting off the calling loop and converting the transmitter/receiver calling mode back into a call standby mode, when the hook switch is on-hooked; forming a speaker phone calling loop and automatically dialing the registered telephone number of a predetermined subscriber to function in a speaker phone calling mode; cutting off the calling loop and converting the speaker phone calling mode back into a call standby mode, when a speaker phone calling ending key is input or when a busy tone or a non-voice state is detected; forming the calling loop of the "flip-type" remote handset and automatically dialing the registered telephone number to perform in a remote calling mode, when the automatic calling mode is established and a flip switch of the "flip-type" remote handset is turned on; cutting off the calling loop of the "flip-type" remote handset and converting the remote calling mode into the call standby state, when the flip switch is turned off or when the busy tone or the non-voice state is detected; forming the calling loop of the "flip-type" remote handset and automatically dialing the registered telephone number to perform in a remote calling mode, when the automatic calling mode is established, and determining whether a call key signal is input through the "flip-type" remote handset; cutting off the calling loop of the "flip-type" remote handset and then converting the remote calling mode into the call standby state, when the call key signal is input through the "flip-type" remote handset or when the busy tone or the non-voice state is detected.

Figure 6B:
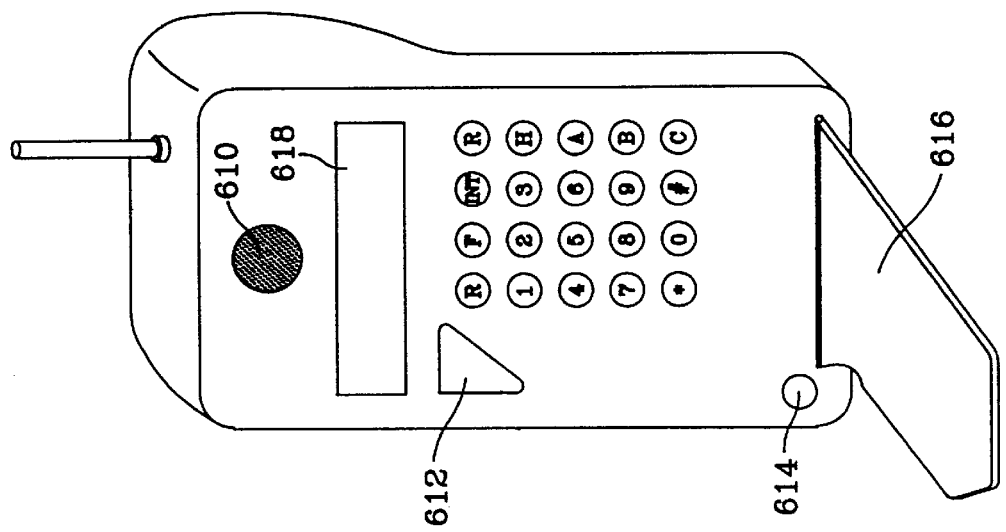
FIGS. 6A and 6B are perspective views of a "flip-type" remote handset of a cordless telephone system according to the present invention.
Figure 6A:
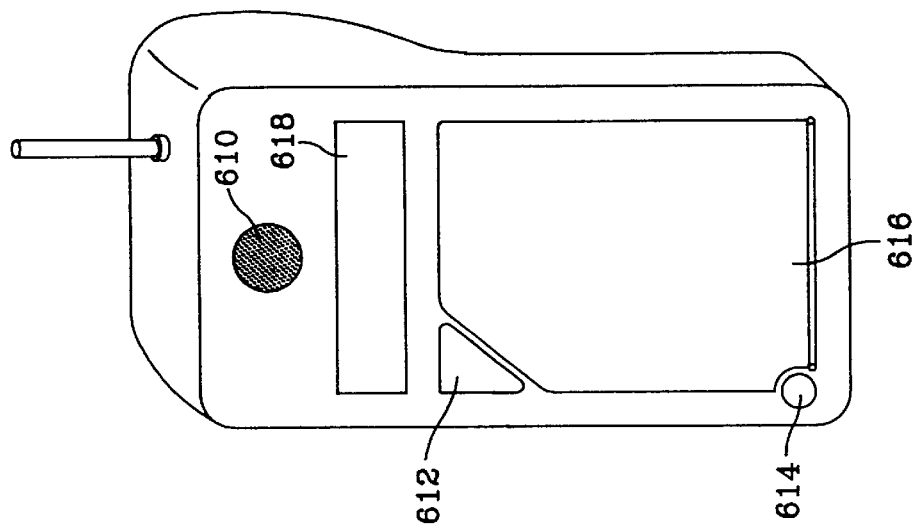

Turning now to FIGS. 6A and 6B which show perspective views of a "flip-type" remote handset of the cordless telephone system constructed according to the principles of the present invention. The "flip-type" remote handset typically includes an antenna, a speaker 610 provided on an upper front surface thereof, a call key 612, a microphone 614 provided on a lower front surface thereof a flip 616 rotatably attached to a bottom edge thereof, and a display unit 618 which is usually in a form of a liquid crystal display for providing a visual display of an operation state of the remote handset. The flip 616 as shown in FIG. 6A is in a closed position. When the flip 616 is in a closed position, the flip 616 covers partially the keypad leaving the call key exposed and accessible to the user and thereby enabling the user to access the call key necessary to answer an incoming call in response to an alarm, e.g., ringing sound, without opening the flip 616. When the flip 616 is in an opened position as shown in FIG. 6A, however, the keypad comprising a plurality of numeric dial keys, function keys such as a redial key R, a function termination key K, intercom key INT, a flash key R, a memory key H, and one touch dial keys A, B, C is fully accessible for operation.

Refer back to FIGS. 1 and 3 in which a process of registering a telephone number of a predetermined subscriber for automatically forming the calling path will now be described in detail as follows.

First, the first controller 110 of FIG. 1 determines whether a base station is in a call standby state at step 310. When the base station is not in a call standby state, the first controller 110 performs corresponding function at step 324. If, on the other hand, the base station is in a call standby state, the first controller 110 determines whether a telephone number establishing key is input through the first key input unit 140 converting a call standby mode into a telephone number establishing mode at step 312. If there is no telephone number establishing key input through the first key input unit 140 at step 312, the first controller 110 returns to step 310 to determine whether a base station is in a call standby state. When there is a telephone number establishing key input at step 312, however, the first controller 110 determines next whether a numeral key corresponding to a telephone number of a predetermined subscriber is input through the first key input unit 140 at step 314. If such a numeral key corresponding to the telephone number of a predetermined subscriber is input through the first key input unit 140, the first controller 110 deletes a conventional telephone number registered in the first memory 138 at step 316, and then registers the telephone number of the predetermined subscriber as a new number in the first memory 138 at step 318. Once the telephone number of the predetermined subscriber is registered in the first memory 138 at step 318, the first controller 110 determines whether an end key is input through the first key input unit 140 for terminating the registration of a new telephone number at step 320. When the end key is input through the first key input unit 140 at step 320, the first controller 110 converts the base station back to a call standby state at step 322. When there is no numeral key corresponding to the telephone number of a predetermined subscriber input through the first key input unit 140 at step 314, however, the first controller 110 proceeds to step 320 to determine whether the end key is input in order to convert the base station back to a call standby state.

Refer back to FIGS. 1 and 4A–4B in which a process of changing a telephone number of a predetermined subscriber registered in a base station of a cordless telephone system for executing an automatic calling function from a remote and different telephone system connected to the telephone network will now be described in detail as follows.

First, the first controller 110 determines whether a base station is in a call standby state at step 410. When the base station is in a call standby state, the first controller 110 determines whether a ring signal is received from the telephone line at step 412. When the ring signal is received from the telephone line at step 412, the first controller 110 determines whether an automatic calling mode is established at step 414. When the automatic calling mode is not established at step 414, the first controller 110 performs corresponding function at step 438 and returns to step 410 determining whether the base station is in the call standby state.

When the automatic calling mode is established at step 414, the first controller 110 converts such an automatic calling mode into a telephone number changing mode without generating a ringer sound according to a program stored in the first memory 138 at step 416, and then transmits a secret number input requiring guide message read from the voice storing unit 128 through the CODEC 124 to a remote and different telephone system connected to the telephone network requesting the change in the telephone number registered in the first memory 138 for executing an automatic calling function at some later time at step 418. Once the secret number input requiring guide message is transmitted to the remote and different telephone system at step 418, the first controller 138 determines whether an exact secret number is input from the remote and different telephone system at step 420. If the exact secret number is not input from the remote and different telephone system at step 420, the first controller 110 reads an alarm message of the incorrect secret number from the voice storing unit 128 under control of the digital signal processor 126, converts the read alarm message into a voice signal through the CODEC 124 and transmits the converted voice signal representing an alarm message of inexact secret number to the remote and different telephone system at step 440.

After an alarm message of inexact secret number is transmitted back to the remote and different telephone system at step 440, the first controller 110 determines whether a counter value of an internal counter reaches a predetermined value, for example, a constant two at step 442. If the the counter value reaches the predetermined value, the counter is set as zero (0) at step 444 and then the telephone number changing mode is converted into the call standby state at step 434. If, on the hand, the counter value is less than the predetermined value, the counter value is added by a constant value such as one at step 446, and the first controller 110 returns to step 420 to determine whether an exact secret number is input from a remote and different telephone system connected to the telephone network.

But, if the exact secret number is received from a remote and different telephone system connected to the telephone network at step 420, the first controller 110 controls the digital signal processor 126 to read a telephone number input requiring guide message registered to the voice storing unit 128, convert the guide message into the voice signal through the CODEC 124 and transmit the converted voice signal representing such a telephone number input requiring guide message to the remote and different telephone system connected to the telephone network at step 422. The first controller 110 then determines whether a numeral key corresponding to the telephone number is input from the remote and different telephone system in correspondence with the telephone number input requiring guide message at step 424. In the case that the numeral key is input from the remote and different telephone system, the first controller 110 deletes the telephone number previously registered to the first memory 138 at step 426, and registers a new outside telephone number input from the remote and different telephone system in the first memory 138 at step 428. Also, in order to inform that the outside telephone number registration is ended, the first controller 110 controls the digital signal processor 126 to read a telephone number registration completing guide message registered to the voice storing unit 128, convert the guide message into a voice signal through the CODEC 124 and transmit the converted voice signal representing such a telephone number registration completing guide message to the remote and different telephone system indicating that a new telephone number of a new subscriber is registered for future execution of an automatic calling function using the newly registered telephone number. And then, the first processor 110 determines whether such a registration calling is ended at step 432.

If the registration calling is not ended at step 432, the first processor 110 determines whether a numeral key corresponding to the new telephone number of a new subscriber is received from the remote and different telephone system at step 436. When a numeral key corresponding to the new telephone number is again input at step 436, the first controller 110 again performs the telephone number registration procedure from step 426 to step 430. If, however, the registration calling is ended at step 432, the first controller 110 converts the telephone number changing mode into the call standby state at step 434.

In the following, the process of forming a calling loop of an established outside telephone number will be described in detail with reference to FIGS. 1, 2, 5A, 5B, 6A and 6B as follows.

The first controller 110 first determines whether a base station is in a call standby state at step 510 of FIG. 5A, and then determines whether an automatic calling mode is established at step 512. In the case that the automatic calling mode is not established at step 512, the corresponding function is performed at step 570. In the case that the automatic calling mode is established at step 512, however, the first controller 110 determines whether a hook switch 112 is off-hooked at step 514.

When the hook switch 112 is off-hooked at step 514, the first controller 110 controls the calling circuit 114 to connect the telephone line to the transmitting/receiving unit 144 of the base station at step 516. The first controller 110 then reads the telephone number registered in the first memory 138 and controls the DTMF generator 118 to generate a DTMF signal corresponding to the read telephone number. That is, the first controller 110 automatically dials the registered telephone number at step 518 and converts to a transmitter/receiver calling mode to make the phone call through the transmitting/receiving unit 144 at step 520. After the base station is in a transmitter/receiver calling mode at step 520, the first controller 110 determines whether the hook switch 112 is on-hooked at step 522. In the case that the hook switch 112 is on-hooked, the first controller 110 cuts off the calling loop of the transmitting/receiving unit 144 at step 566 and converts the transmitter/receiver calling mode into a call standby state at step 568.

In the case that the automatic calling mode is established at step 512 and the hook switch 112 is not hooked-off at step 514, the first controller 110 determines whether any numeral key is input through the first key input unit 140 at step 524. When a numeral key is input at step 524, the first controller 110 controls the calling circuit 114 to connect the telephone line to the speaker phone circuit 130 and thereby forming a speaker phone calling loop at step 526. The first controller 110 then reads the telephone number registered in the first memory 138 and controls the DTMF generator 118 to thereby generate a DTMF signal corresponding to the read telephone number. In other words, the first controller 110 automatically dials the registered telephone number at step 528 and converts to a speaker phone calling mode in order to make the phone call through the speaker phone circuit 130 at step 530.

After the base station is in a speaker phone calling mode at step 530, the first controller 110 determines whether a speaker phone calling ending key is input through the key input unit 140 at step 532. When the speaker phone calling ending key is input through the key input unit 140 at step 532, the first controller 110 cuts off the calling loop of the speaker phone circuit 130 at step 566 and converts the speaker phone calling mode into a call standby state at step 568. When the speaker phone calling ending key is not input through the key input unit 140 at step 532, however, the first controller 110 determines whether a busy tone is detected by the tone detector 120 at step 534. In the case that the busy tone representing a calling ending signal is detected by the tone detector 120 at step 534, the first processor 110 also cuts off the calling loop of the speaker phone circuit 130 at step 566 and converts the speaker phone calling mode into a call standby state at step 568. If the busy tone is not detected by the tone detector 120 at step 534, however, the first controller 110 continues to determine whether a non-voice state is maintained during an established time from the VOX circuit 122, and then cut off the calling loop of the speaker phone circuit 130 at step 566 and convert the speaker phone calling mode into a call standby state at step 568 when a non-voice state is detected by the VOX circuit 122.

When a numeral key is not input at step 524, the first controller 110 determines, at step 538, whether a flip 616 of the "flip-type" remote handset as shown in FIGS. 6A and 6B is opened to thereby turn on the flip switch 220 of FIG. 2. In the case that the flip switch 220 of the remote is turned on, the first controller 110 receives a signal from the second controller 210 of the "flip-type" remote handset and controls the calling circuit 114 at step 540, thereby to connect the telephone line to the "flip-type" remote handset. The first controller 110 reads the outside telephone number registered in the first memory 138 at step 542, and controls the DTMF generator 118 to thereby generate a DTMF signal corresponding to the read telephone number. In other words, the first controller 110 automatically dials the outside telephone number and converts to a remote calling mode in order to make the phone call through the "flip-type" remote handset at step 544.

After the cordless telephone system is in a remote calling mode at step 544, the first controller 110 determines whether the flip 616 of the "flip-type" remote handset is closed to thereby turn off the flip switch 220 at step 546. In the case that the flip switch 220 is turned off, the first controller 110 cuts off the calling loop of the "flip-type" remote handset at step 566 and converts the remote calling mode into a call standby state at step 568. And, in the case that the busy tone representing a calling ending signal is detected in the tone detector 120 at step 548 or that the non-voice state is maintained during the established time from the VOX circuit 122 at step 550, the first controller 110 cuts off the calling loop of the "flip-type" remote handset at step 566 and converts the remote calling mode into a call standby state at step 568.

Also, in the case that the flip switch 220 of the "flip-type" remote handset automatic calling mode is not turned on at step 538, the first controller 110 determines whether a call key 612 is input through the "flip-type" remote handset of FIGS. 6A and 6B at step 552. In the case that the call key 612 of the "flip-type" remote handset is input through the "flip-type" remote handset, the first controller 110 receives the signal from the second controller 210 of the "flip-type" remote handset and controls the calling circuit 114 to connect the telephone line to the "flip-type" remote handset at step 544. At step 556, the first controller 110 reads the outside telephone number registered in the first memory 138 and controls the DTMF generator 118 to thereby generate a DTMF signal corresponding to the read telephone number. That is, the first controller 110 automatically dials the outside telephone number and converts to a remote calling mode in order to make the phone call through the "flip-type" remote handset at step 558.

Also, after the cordless telephone system is in a remote calling mode at step 558, the first controller 110 determines again whether a call key 612 of the "flip-type" remote handset is input at step 560. In the case that the call key 612 is input through the "flip-type" remote handset, the first controller 110 cuts off the calling loop of the "flip-type" remote handset at step 566 and converts the remote calling mode into a call standby state at step 568. And, in the case that the busy tone representing a calling ending signal is detected in the tone detector 120 at step 562 or that the non-voice state is maintained during the established time from the VOX circuit 122 at step 564, the first controller 110 cuts off the calling loop of the "flip-type" remote handset at step 566 and converts the remote calling mode into a call standby state at step 568.

As discussed above, the method for executing an automatic calling function in a cordless telephone comprising a base station and a "flip-type" remote handset having a flip cover operable in an opened position and a closed position for partially covering a keypad leaving a call key exposed and accessible to a user according to the present invention realizes that an infant or an illiterate old person can automatically dial an outside telephone number to make the phone call when a numeral key is input or a transmitter/receiver is hang up, or when a call key of the "flip-type" remote handset is input or a flip cover is opened at the time of an emergency. Therefore, at the time of an emergency, there is an advantage in that the emergency can be quickly coped by simply and conveniently realizing the automatic calling function. Also, there is an advantage in which when a busy tone is detected or a non-voice state is maintained, a calling path is automatically cut off, thereby to eliminate an inconvenience caused by cutting the calling path by the key operation and thereby making it easy for the infant or the illiterate old to make the phone call.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for executing an automatic calling function in a cordless telephone system, said method comprising the steps of:

receiving a telephone number establishing key input signal corresponding to a first telephone number of a predetermined subscriber at a stationary base station of said cordless telephone system having a hook switch connected to a telephone network for registration in a memory, said cordless telephone system comprising a "flip-type" remote handset in wireless communication with said base station and having a flip cover operable in an opened position and a closed position for covering a keypad leaving a call key exposed and accessible to a user;

establishing an automatic calling mode at said base station for execution of an automatic calling function, and automatically dialing said first telephone number registered in said memory from said memory upon a calling request from one of said base station and said "flip-type" remote handset to form a calling path with said predetermined subscriber;

changing said first telephone number registered in said memory in response to said telephone number establishing key input signal and instructions from a remote communication system via said telephone network; and cutting off said calling path when a call ending is detected, and converting said automatic calling mode into a call standby state.

2. The method of claim 1, further comprised of said first telephone number of said predetermined subscriber being registered by:

inputting said first telephone number of said predetermined subscriber at said base station when said base station is in a telephone number registering mode; and registering said first telephone number of said predetermined subscriber in said memory.

3. The method of claim 1, further comprised of said first telephone number registered in said memory being changed by:

converting said automatic calling mode into a telephone number changing mode without generating a ringer sound when a calling signal is received from said remote communication system via said telephone network during said automatic calling mode, and transmitting a secret number input requiring guide message to said remote communication system via said telephone network requesting for input of a secret number;

transmitting a new telephone number input requiring guide message to said remote communication system via said telephone network requesting for input of a new telephone number for registration when an exact secret number is input from said remote communication system via said telephone network in correspondence with said secret number input requiring guide message;

registering a new telephone number of a different predetermined subscriber in said memory when said new telephone number is input from said remote communication system via said telephone network in correspondence with said telephone number input requiring guide message; and transmitting a telephone number change completing guide message to said remote communication system via said telephone network indicating completion of said registration and converting said telephone number changing mode back into said automatic calling mode.

4. The method of claim 3, further comprising the steps of:

transmitting an alarm message to said remote communication system when an inexact secret number is input from said remote communication system via said telephone network in correspondence with said secret number input requiring guide message; and deleting said first telephone number previously registered in said memory when the exact secret number is input from said remote communication system via said telephone network in correspondence with said secret number input requiring guide message prior to registration of the new telephone number.

5. The method of claim 1, further comprised of said calling path being formed by:

determining a state of said hook switch of said base station in said automatic calling mode for executing said automatic calling function to form said calling path with said predetermined subscriber; and dialing said first telephone number of said predetermined subscriber registered in said memory when said hook switch of said base station is off-hooked, to form said calling path.

6. The method of claim 1, further comprised of said calling path being formed by:

determining whether a numeral key is input through said base station in said automatic calling mode for executing said automatic calling function to form said calling path with said predetermined subscriber; and dialing said first telephone number of said predetermined subscriber registered in said memory when said numeral key is input through said base station, to form said calling path.

7. The method of claim 1, further comprised of said calling path being formed by:

determining whether a flip switch of said "flip-type" remote handset in wireless communication with said base station is turned on, when the flip cover is in said opened position for executing said automatic calling function to form said calling path with said predetermined subscriber, and dialing said first telephone number of said predetermined subscriber registered in said memory, when said flip switch of said "flip-type" remote handset is turned on, to form said calling path.

8. The method of claim 1, further comprised of said calling path being formed by:

determining whether a call key signal corresponding to depression of said call key is input from said "flip-type" remote handset in wireless communication with said base station for executing dialing said first telephone number of said predetermined subscriber registered in said memory, when said call key signal is input from said "flip-type" remote handset, to form said calling path.

9. The method of claim 5, further comprised of said calling path being cut off when said hook switch is on-hooked and then said automatic calling mode is converted into said call standby state.

10. The method of claim 6, further comprised of said calling path being cut off when a call end key is input from said base station, or when one of a busy tone and a non-voice state is detected during a predetermined time period.

11. The method of claim 7, further comprised of said calling path being cut off when said flip switch is turned off, or when one of a busy tone and a non-voice state is detected during a predetermined time period.

12. The method of claim 8, further comprised of said calling path being cut off when said call key signal is again input from said "flip-type" remote handset, or when one of a busy tone and a non-voice state is detected during a predetermined time period.

13. A method for executing an automatic calling function in a cordless telephone system connected to a telephone network, said method comprising the steps of:

receiving a first telephone number of a predetermined subscriber for registration at a stationary base station of a cordless telephone system from a remote communication system connected to said telephone network, said cordless telephone system comprising said base station having a hook switch and a memory, and a "flip-type" remote handset in wireless communication with said base station and having a flip cover operable in an opened position and a closed position for partially covering a keypad leaving a call key exposed and accessible to a user, in said memory when said base station is in a telephone number registering mode;

automatically dialing said first telephone number registered in said memory of said base station for executing said automatic calling function to establish a calling path with said predetermined subscriber, when said hook switch of said base station is off-hooked in an automatic calling mode;

changing said first telephone number registered in said memory in response to instructions from said remote communication system via said telephone network, and cutting off said calling path and converting said automatic calling mode into a standby mode when said hook switch of said base station is on-hooked.

14. The method of claim 13, further comprised of said first telephone number registered in said memory being changed by:

converting said automatic calling mode into a telephone number changing mode without generating a ringer sound when a calling signal is received from said remote communication system via said telephone network during said automatic calling mode, and transmitting a secret number input requiring guide message to said remote communication system requesting for input of a secret number;

transmitting a new telephone number input requiring guide message to said remote communication system via said telephone network requesting for input of a new telephone number for registration, when an exact secret number is input from said remote communication system via said telephone network in correspondence with said secret number input requiring guide message;

registering a new telephone number of a different predetermined subscriber in said memory, when said new telephone number is input from said remote communication system via said telephone network in correspondence with said telephone number input requiring guide message; and transmitting a telephone number change completing guide message to said remote communication system via said telephone network indicating completion of said registration and converting said telephone number changing mode back into said automatic calling mode.

15. The method of claim 14, further comprising the steps of:

transmitting an alarm message to said remote communication system when an inexact secret number is input from said remote communication system via said telephone network in correspondence with said secret number input requiring guide message; and deleting said first telephone number previously registered in said memory, when the exact secret number is input from said remote communication system via said telephone network in correspondence with said secret number input requiring guide message prior to registration of the new telephone number.

16. A method for executing an automatic calling function in a cordless telephone system including a base station comprising a voice circuit for detecting a non-voice state, a tone detector for detecting a busy tone, a memory for registering a telephone number thereto, and a speaker phone for establishing a telephone call through a microphone and a speaker, said method comprising the steps of:

receiving a first telephone number of a predetermined subscriber for registration in said memory;

automatically calling said predetermined subscriber by dialing said first telephone number registered in said memory when a key signal is input through said base station, to form a calling path via said speaker phone;

changing said first telephone number registered in said memory in response to instructions from a remote communication system via a telephone network: and cutting off said calling path via said speaker phone when a call end key is input through said base station.

17. The method of claim 16, further comprised of said first telephone number registered in said memory being changed by:

converting said automatic calling mode into a telephone number changing mode without generating a ringer sound when a calling signal is received from said remote communication system via said telephone network during said automatic calling mode, and transmitting a secret number input requiring guide message to said remote communication system requesting for input of a secret number;

transmitting a new telephone number input requiring guide message to said remote communication system via said telephone network requesting for input of a new telephone number for registration, when an exact secret number is input from said remote communication system via said telephone network in correspondence with said secret number input requiring guide message;

registering a new telephone number of a different predetermined subscriber in said memory when said new telephone number is input from said remote communication system via said telephone network in correspondence with said telephone number input requiring guide message; and transmitting a telephone number change completing guide message to said remote communication system via said telephone network indicating completion of said registration and converting said telephone number changing mode back into said automatic calling mode.

18. The method of claim 17, further comprising the steps of:

transmitting an alarm message to said remote communication system, when an inexact secret number is input from said remote communication system via said telephone network in correspondence with said secret number input requiring guide message; and deleting said first telephone number previously registered in said memory when the exact secret number is input from said remote communication system via said telephone network in correspondence with said secret number input requiring guide message prior to registration of the new telephone number.

19. The method of claim 16, further comprised of said calling path being cut off when said call key signal is again input from said "flip-type" remote handset, or when one of a busy tone is detected by said tone detector and a non-voice state is detected by said voice circuit during a predetermined time period.

20. A cordless telephone system, comprising:

a "flip-type" remote handset comprising a call key, a keypad of numeric keys and function keys, a flip cover operable in an opened position and a closed position for covering said keypad leaving said call key exposed and a flip switch operable in response to movement of said flip cover;

a base station comprising a hook switch connected to a telephone line of a telephone network, a voice circuit for detecting a non-voice state, a tone detector for detecting a busy tone and a memory for registering a telephone number thereto, said base station including a program for allowing execution of an automatic calling function by:

receiving a first telephone number of a predetermined subscriber for registration from a remote communication system via said telephone network, in said memory;

automatically dialing said first telephone number registered in said memory for executing said automatic calling function to establish a calling path with said predetermined subscriber, when said flip switch of said "flip-type" remote handset is turned on;

changing said first telephone number registered in said memory in response to instructions from said remote communication system via said telephone network; and cutting off said calling path with said predetermined subscriber, when said flip switch of said "flip-type" remote handset is turned off.

21. The cordless telephone system of claim 20, comprised of said calling path being cut off when one of a busy tone is detected by said tone detector and a non-voice state is detected by said voice circuit during a predetermined time period.

22. A cordless telephone system, comprising:

a "flip-type" remote handset comprising a call key, a keypad of numeric keys and function keys, a flip cover operable in an opened position and a closed position for covering said keypad leaving said call key exposed and a flip switch operable in response to movement of said flip cover;

a base station comprising a hook switch connected to a telephone line of a telephone network, a voice circuit for detecting a non-voice state, a tone detector for detecting a busy tone and a memory for registering a telephone number thereto, said base station including a program for allowing execution of an automatic calling function by:

receiving a first telephone number of a predetermined subscriber for registration from a remote communication system via said telephone network, in said memory;

automatically dialing said first telephone number registered in said memory for executing said automatic calling function to establish a calling path with said predetermined subscriber, when said flip switch of said "flip-type" remote handset is turned on; and cutting off said calling path with said predetermined subscriber, when said flip switch of said "flip-type" remote handset is turned off;

wherein said program for allowing execution of said automatic calling function further permits:

converting an automatic calling mode into a telephone number changing mode without generating a ringer sound when a calling signal is received from said remote communication system via said telephone network during said automatic calling mode, and transmitting a secret number input requiring guide message to said remote communication system via said telephone network requesting for input of a secret number;

transmitting a new telephone number input requiring guide message to said remote communication system via said telephone network requesting for input of a new telephone number for registration when an exact secret number is input from said remote communication system via said telephone network in correspondence with said secret number input requiring guide message;

registering a new telephone number of a different predetermined subscriber in said memory when said new telephone number is input from said remote communication system via said telephone network in correspondence with said telephone number input requiring guide message; and transmitting a telephone number change completing guide message to said remote communication system via said telephone network indicating completion of said registration and converting said telephone number changing mode to a standby mode.

23. The cordless telephone system of claim 22, wherein said program for allowing execution of said automatic calling function further permits:

transmitting an alarm message to said remote communication system when an inexact secret number is input from said remote communication system via said telephone network in correspondence with said secret number input requiring guide message; and deleting said first telephone number previously registered in said memory when the exact secret number is input from said remote communication system via said telephone network in correspondence with said secret number input requiring guide message prior to registration of the new telephone number.

* * * * *